US00RE47200E

(19) United States
(12) Reissued Patent
Jiang et al.

(10) Patent Number: US RE47,200 E
(45) Date of Reissued Patent: Jan. 8, 2019

(54) PREVENTING SHORTENED LIFETIMES OF SECURITY KEYS IN A WIRELESS COMMUNICATIONS SECURITY SYSTEM

(71) Applicant: L2 Mobile Technologies LLC, Plano, TX (US)

(72) Inventors: Sam Shiaw-Shiang Jiang, Taipei (TW); Richard Lee-Chee Kuo, Taipei (TW); Chi-Fong Ho, Hsin-Chu Hsien (TW)

(73) Assignee: L2 Mobile Technologies LLC, Plano, TX (US)

(21) Appl. No.: 14/283,801

(22) Filed: May 21, 2014

Related U.S. Patent Documents

Reissue of:
(64) Patent No.: 6,925,183
Issued: Aug. 2, 2005
Appl. No.: 09/682,310
Filed: Aug. 16, 2001

(51) Int. Cl.
*H04L 29/06* (2006.01)
*H04W 12/04* (2009.01)

(52) U.S. Cl.
CPC ..... *H04L 63/0428* (2013.01); *H04L 63/18* (2013.01); *H04W 12/04* (2013.01)

(58) Field of Classification Search
CPC ..... H04L 9/00; H04L 63/0428; H04L 63/18; H04K 1/00; H04Q 7/20; H04W 12/04
USPC ..... 380/278, 270, 261, 247; 455/435.1
See application file for complete search history.

(56) References Cited

U.S. PATENT DOCUMENTS 4,811,394 A * 3/1989 Ragavan et al. ..... 380/261
5,237,612 A * 8/1993 Raith ..... 380/247
5,727,064 A * 3/1998 Reeds, III ..... 380/270
6,081,601 A * 6/2000 Raivisto ..... 380/270
6,473,613 B2 * 10/2002 Beamish et al. ..... 455/435.1
6,535,979 B1 * 3/2003 Vialen ..... H04W 12/02 370/343

(Continued)

FOREIGN PATENT DOCUMENTS

WO WO-99/39525 8/1999
WO WO-00/28744 5/2000

OTHER PUBLICATIONS

Universal Mobile Telecommunications System (UMTS); 3G Security; Security Architecture (3G TS 33.102 version 3.5.0), Jul. 2000.*

(Continued)

*Primary Examiner* — Mark Sager
(74) *Attorney, Agent, or Firm* — Fitch, Even, Tabin & Flannery LLP

(57) ABSTRACT

23A wireless communications device has a first security key, a second security key, and established channels. Each established channel has a corresponding security count value, and utilizes a security key. At least one of the established channels utilizes the first security key. The second security key is assigned to a new channel. A first set is then used to obtain a first value. The first set has only security count values of all the established channels that utilize the second key. The first value is at least as great as the x most significant bits ($MSB_x$) of the greatest value in the first set. The $MSB_x$ of the initial security count value for the new channel is set equal to the first value. If the first set is empty, then the initial security count is set to zero.

5 Claims, 2 Drawing Sheets

(56) References Cited

U.S. PATENT DOCUMENTS

| | | | | |
|---|---|---|---|---|
| 6,728,529 | B2 * | 4/2004 | Kuo et al. | 455/411 |
| 2002/0110243 | A1 * | 8/2002 | Jiang et al. | 380/273 |
| 2003/0035545 | A1 * | 2/2003 | Jiang | 380/272 |

OTHER PUBLICATIONS

3GPP TS 25.322 V3.7.0; 3rd Generation Partnership Project; Technical specification Group Radio Access Network; RLC protocol specification (Release 1999); Jun. 2001; pp. 1-57; XP-002259818.
3GPPTS 25.331 V.3.7.0 (Jun. 2001) (8.1.12.3/8.5.9/8.6.4/8.6.4.1/8.6.4.2/8.6.4.29/8.6.4.3).
3 GPP TS 33.102 V.3.9.0 (Jun. 2001) (6.4.3/6.4.8/6.6.4/6.6.4.1/6.5.4.1).

* cited by examiner

PREVENTING SHORTENED LIFETIMES OF SECURITY KEYS IN A WIRELESS COMMUNICATIONS SECURITY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND OF INVENTION

1. Field of the Invention

The present invention relates to security count values in a wireless communications system. In particular, the present invention discloses a method for obtaining a security count value for a new channel that is established during a changing of a security key.

2. Description of the Prior Art

Please refer to FIG. 1. FIG. 1 is a simplified block diagram of a prior art wireless communications system. The wireless communications system includes a first station 10 in wireless communications with a second station 20. As an example, the first station 10 is a mobile unit, such as a cellular telephone, and the second station 20 is a base station. The first station 10 communicates with the second station 20 over a plurality of channels 12. The second station 20 thus has corresponding channels 22, one for each of the channels 12. Each channel 12 has a receiving buffer 12r for holding protocol data units (PDUs) 11r received from the corresponding channel 22 of the second station 20. Each channel 12 also has a transmitting buffer 12t for holding PDUs 11t that are awaiting transmission to the corresponding channel 22 of the second station 20. A PDU 11t is transmitted by the first station 10 along a channel 12 and received by the second station 20 to generate a corresponding PDU 21r in the receiving buffer 22r of the corresponding channel 22. Similarly, a PDU 21t is transmitted by the second station 20 along a channel 22 and received by the first station 10 to generate a corresponding PDU 11r in the receiving buffer 12r of the corresponding channel 12.

For the sake of consistency, the data structures of each PDU 11r, 11t, 21r and 21t along corresponding channels 12 and 22 are identical. That is, a transmitted PDU 11t generates an identical corresponding received PDU 21r, and vice versa. Furthermore, both the first station 10 and the second station 20 use identical PDU 11t, 21t data structures. Although the data structure of each PDU 11r, 11t, 21r and 21t along corresponding channels 12 and 22 is identical, different channels 12 and 22 may use different PDU data structures according to the type of connection agreed upon along the corresponding channels 12 and 22. In general, though, every PDU 11r, 11t, 21r and 21t will have a sequence number 5r, 5t, 6r, 6t. The sequence number 5r, 5t, 6r, 6t is an m-bit number that is incremented for each PDU 11r, 11t, 21r, 21t. The magnitude of the sequence number 5r, 5t, 6r, 6t indicates the sequential ordering of the PDU 11r, 11t, 21r, 21t in its buffer 12r, 12t, 22r, 22t. For example, a received PDU 11r with a sequence number 5r of 108 is sequentially before a received PDU 11r with a sequence number 5r of 109, and sequentially after a PDU 11r with a sequence number 5r of 107. The sequence number 5t, 6t is often explicitly carried by the PDU 11t, 21t, but may also be implicitly assigned by the station 10, 20. For example, in an acknowledged mode setup for corresponding channels 12 and 22, each transmitted PDU 11t, successful reception of which generates an identical corresponding PDU 21r, is confirmed as received by the second station 20. A 12-bit sequence number 5t is explicitly carried by each PDU 11t in acknowledged mode transmissions. The second station 20 scans the sequence numbers 6r embedded within the received PDUs 21r to determine the sequential ordering of the PDUs 21r, and to determine if any PDUs 21r are missing. The second station 20 can then send a message to the first station 10 that indicates which PDUs 21r were received by using the sequence numbers 6r of each received PDU 21r, or may request that a PDU It be re-transmitted by specifying the sequence number 5t of the PDU 11t to be re-transmitted. Alternatively, in a so-called transparent transmission mode, data is never confirmed as successfully received. The sequence numbers 5t, 6t are not explicitly carried in the PDUs 11t, 21t. Instead, the first station 10 simply internally assigns a 7-bit sequence number 5t to each PDU 11t. Upon reception, the second station 20 similarly assigns a 7-bit sequence number 6r to each PDU 21r. Ideally, the sequence numbers 5t maintained by the first station 10 for the PDUs 11t are identical to the corresponding sequence numbers 6r for the PDUs 21r that are maintained by the second station 20.

Hyper-frame numbers (HFNs) are also maintained by the first station 10 and the second station 20. Hyper-frame numbers may be thought of as high-order (i.e., most significant) bits of the sequence numbers 5t, 6t, and which are never physically transmitted with the PDUs 11t, 21t. Exceptions to this rule occur in rare cases of special signaling PDUs 11t, 21t that are used for synchronization. In these cases, the HFNs are not carried as part of the sequence number 11t, 21t, but instead are carried in fields of the data payload of the signaling PDU 11t, 21t, and thus are more properly signaling data. As each transmitted PDU 11t, 21t generates a corresponding received PDU 21r, 11r, hyper-frame numbers are also maintained for received PDUs 11r, 21r. In this manner, each received PDU 11r, 21r, and each transmitted PDU 11t, 21t is assigned a value that uses the sequence number (implicitly or explicitly assigned) 5r, 6r, and 5t, 6t as the least significant bits, and a corresponding hyper-frame number (always implicitly assigned) as the most significant bits. Each channel 12 of the first station 10 thus has a receiving hyper-frame number ($HFN_R$) 13r and a transmitting hyper-frame number ($HFN_T$) 13t. Similarly, the corresponding channel 22 on the second station 20 has a $HFN_R$ 23r and a $HFN_T$ 23t. When the first station 10 detects rollover of the sequence numbers 5r of PDUs 11r in the receiving buffer 12r, the first station 10 increments the $HFN_R$ 13r. On rollover of sequence numbers 5t of transmitted PDUs 11t, the first station 10 increments the $HFN_T$ 13t. A similar process occurs on the second station 20 for the $HFN_R$ 23r and $HFN_T$ 23t. The $HFN_R$ 13r of the first station 10 should thus be synchronized with (i.e., identical to) the $HFN_T$ 23t of the second station 20. Similarly, the $HFN_T$ 13t of the first station 10 should be synchronized with (i.e., identical to) the $HFN_R$ 23r of the second station 20.

The PDUs 11t and 21t are not transmitted "out in the open". A security engine 14 on the first station 10, and a corresponding security engine 24 on the second station 20, together ensure secure and private exchanges of data exclusively between the first station 10 and the second station 20. The security engine 14, 24 has two primary functions. The first is the obfuscation (i.e., ciphering, or encryption) of data held within a PDU 11t, 21t so that the corresponding PDU 11r, 21r presents a meaningless collection of random numbers to an eavesdropper. The second function is to verify the integrity of data contained within the PDUs 11r, 21r. This is used to prevent another, improper, station from masquerading as either the first station 10 or the second station 20. By verifying data integrity, the first station 10 can be certain that a PDU 11r was, in fact, transmitted by the second station 20, and vice versa. For transmitting a PDU 11t, the security engine 14 uses, amongst other inputs, an n-bit security count 14c and a security key 14k to perform the ciphering functions upon the PDU 11t. To properly decipher the corresponding PDU 21r, the security engine 24 must use an identical security count 24c and security key 24k. Similarly, data integrity checking on the first station 10 uses an n-bit security count that must be synchronized with a corresponding security count on the second station 20. As the data integrity security count is generated in a manner similar to that for the ciphering security count 14c, 24c, and as ciphering is more frequently applied, the ciphering security count 14c, 24c is considered in the following. The security keys 14k and 24k remain constant across all PDUs 11t and 21t (and thus corresponding PDUs 21r and 11r), until explicitly changed by both the first station 10 and the second station 20. Changing of the security keys 14k, 24k is effected by a security mode command that involves handshaking between the first station 10 and the second station 20 to ensure proper synchronization of the security engines 14, 24. The security mode command is relatively infrequently performed, and depends upon the value of the security count 14c. They security keys 14k, 24k are thus relatively persistent. The security counts 14c and 24c, however, continuously change with each PDU 11t and 21t. This constant changing of the security count 14c, 24c makes decrypting (and spoofing) of PDUs 11t, 21t more difficult, as it reduces statistical consistency of inputs into the security engine 14, 24. The security count 14c for a PDU 11t is generated by using the sequence number 5t of the PDU 11t as the least significant bits of the security count 14c, and the $HFN_T$ 13t associated with the sequence number 5t as the most significant bits of the security count 14c. Similarly, the security count 14c for a PDU 11r is generated from the sequence number 5r of the PDU 11r and the $HFN_R$ 13r of the PDU 11r. An identical process occurs on the second station 20, in which the security count 24c is generated using the sequence number 6r or 6t, and the appropriate $HFN_R$ 23r or $HFN_T$ 23t. The security count 14c, 24c has a fixed bit size, say 32 bits. As the sequence numbers 5r, 6r, 5t, 6t may vary in bit size depending upon the transmission mode used, the hyper-frame numbers $HFN_R$ 13r, $HFN_R$ 23r, $HFN_T$ 13t and $HFN_T$ 23t must vary in bit size in a corresponding manner to yield the fixed bit size of the security count 14c, 24c. For example, in a transparent transmission mode, the sequence numbers 5r, 6r, 5t, 6t are all 7 bits in size. The hyper-frame numbers $HFN_R$ 13r, $HFN_R$ 23r, $HFN_T$ 13t and $HFN_T$ 23t are thus 25 bits in size; combining the two together yields a 32 bit security count 14c, 24c. On the other hand, in an acknowledged transmission mode, the sequence numbers 5r, 6r, 5t, 6t are all 12 bits in size. The hyper-frame numbers $HFN_R$ 13r, $HFN_R$ 23r, $HFN_T$ 13t and $HFN_T$ 23t are thus 20 bits in size so that combining the two together continues to yield a 32 bit security count 14c, 24c.

Initially, there are no established channels 12 and 22 between the first station 10 and the second station 20. The first station 10 thus establishes a channel 12 with the second station 20. To do this, the first station 10 must determine an initial value for the $HFN_T$ 13t and $HFN_R$ 13r. The first station 10 references a non-volatile memory 16, such as a flash memory device or a SIM card, for a start value 16s, and uses the start value 16s to generate the initial value for the $HFN_T$ 13t and the $HFN_R$ 13r. The start value 16s holds the x most significant bits ($MSB_x$) of a hyper-frame number from a previous session along a channel 12. Ideally, x should be at least as large as the bit size of the smallest-sized hyper-frame number (i.e., for the above example, x should be at least 20 bits in size). The $MSB_x$ of the $HFN_T$ 13t and the $HFN_R$ 13r are set to the start value 16s, and the remaining low order bits are set to zero. The first station 10 then transmits the start value 16s to the second station 20 (by way of a special signaling PDU 11t) for use as the $HFN_R$ 23r and the $HFN_T$ 23t. In this manner, the $HFN_T$ 13t is synchronized with the $HFN_R$ 23r, and the $HFN_T$ 23t is synchronized with the $HFN_R$ 13r.

As noted, the first station 10 may establish a plurality of channels 12 with the second station 20. Each of these channels 12 uses its own sequence numbers 5r and 5t, and hyper-frame numbers 13r and 13t. When establishing a new channel 12, the first station 10 considers the $HFN_T$ 13t and $HFN_R$ 13r of all currently established channels 12, selecting the $HFN_T$ 13t or $HFN_R$ 13r having the highest value. The first station 10 then extracts the $MSB_x$ of this highest-valued hyper-frame number 13r, 13t, increments the $MSB_x$ by one, and uses it as the $MSB_x$ for the new $HFN_T$ 13t and $HFN_R$ 13r for a newly established channel 12. Synchronization is then performed between the first station 10 and the second station 20 to provide the $MSB_x$ to the second station 20 for the $HFN_R$ 23r and $HFN_T$ 23t. In this manner, a constantly incrementing spacing is ensured between the security counts 14c of all established channels 12.

It is noted that, for the sake of security, the security keys 14k and 24k should be changed after a predetermined interval. This interval is, in part, determined by the security count 14c, 24c. When the security count 14c for an established channel 12 exceeds a predetermined security crossover value 14x, the second station 20 (i.e., the base station) may initiate the security mode command to change the security keys 14k and 24k to new security keys 14n and 24n. Both of the security keys 14n and 24n are identical, and should not be the same as the previous security keys 14k and 24k. Changing over to the new security keys 14n, 24n must be carefully synchronized across all channels 12, 22 to ensure that that transmitted PDUs 11t, 21t are properly deciphered into received PDUs 21r, 11r. For example, if a PDU 11t is enciphered using the security key 14k and the security engine 24 attempts to decipher the corresponding received PDU 21r using the new security key 24n, the received PDU 21r will be deciphered into meaningless data due to the lack of synchronization of the security keys 14k and 24n as applied to the PDUs 11t and 21r. The security mode command is a somewhat complicated process that takes a finite amount of time. Clearly, before the transmitting of the security mode command by the second station 20, only the security key 14k, 24k is used for all channels 12, 22. Similarly, after the security mode command has been fully completed, only the new security key 14n, 24n will be used for all channels 12, 22. However, during execution of the security mode command, and the resulting hand-shaking between the two stations 10 and 20, there could be confusion as to which security key 14k, 24k, or 14n, 24n should be used. To prevent this from happening, the security mode command provides for a so-called activation time 17r, 27t for each channel 12, 22. The activation time 17r, 27t is simply a sequence number value 5r, 6t of PDUs 11r, 21t. When executing the security mode command, the second station 20 determines an activation time 27t for the transmitting buffer 22t of each channel 22. The activation times 27t are not necessarily the same across all channels 22, and, in fact, will generally be different. The security mode command sent by the second station 20 to the first station 10 provides the activation times 27t to the first station 10, which the first station 10 then uses to generate an identical corresponding activation time 17r for the receiving buffer 12r of each channel 12. In response to the security mode command, the first station 10 determines an activation time 17t for the transmitting buffer 12t of each channel 12. The first station 10 then sends a security mode complete message to the second station 20, which contains the activation times 17t. The second station 20 uses the security mode complete message to provide an activation time 27r to the receiving buffer 22r of each channel 22, which is identical to the activation time 17t of the corresponding channel 12 on the first station 10. The security mode command, and resultant final activation time 17t, are termed a security mode reconfiguration. Using the first station 10 as an example, for all PDUs 11t that have sequence numbers 5t that are prior to the activation time 17t for their channel 12, the PDUs 11t are enciphered using the old security key 14k. For PDUs 11t which have sequence numbers 5t that are sequentially at or after the activation time 17t, the new security key 14n is applied for enciphering. When receiving the PDUs 11t, the second station 20 uses the sequence numbers 6r and the activation time 27r to determine which key 24k or 24n to use for deciphering of the PDUs 21r. A similar transmitting process also occurs on the second station 20, with each channel 22 having the activation time 27t. The security mode command provides for synchronization of the activation times 17r with 27t and 17t with 27r so that the second station 20 and first station 10 may know how to apply their respective security keys 24n, 24k and 14n, 14k to received PDUs 21r, 11r and transmitted PDUs 11t, 21t. In this manner, synchronization is ensured between the security engines 14 and 24. To ensure that full use is obtained from the new security key 14n, 24n, upon adoption of the new security key 14n, 24n by a channel 12, 22 (i.e., after the activation times 17r, 17t and 27r, 27t for the channels 12 and 22), the $HFN_R$ 13r, 23r and the $HFN_T$ 13t, 23t are cleared to zero, thus bringing the security count 14c, 24c for the channel 12, 22 down to zero, or close to zero. For example, after a channel 12 exceeds its activation time 17t, the $HFN_T$ 13t for the channel 12 is set to zero. The corresponding security count 14c for the transmitted PDUs 11t is thus brought close to zero. Similarly, upon receiving a PDU 21r that exceeds the activation time 27r, the second station 20 clears the $HFN_R$ 23r, thus reducing the security count 24c for the received PDUs 21r.

However, the establishment of a new channel 12 during the security mode reconfiguration may lead to a problem that shortens the lifetime of the new security key 14n. When a new channel 12 is being established during the security mode reconfiguration, it is possible that there will be established channels 12 that are using the new security key 14n, and other channels 12 that are still using the old security key 14k. Those channels 12 using the new security key 14n will have hyper-frame numbers 13r, 13t that are zero, or close to zero. However, those channels 12 still using the old security key 14k (because they have not yet reached their respective activation times 13a) will have hyper-frame numbers 13r, 13t that are quite high. When assigning the hyper-frame numbers 13r, 13t to the new channel 12, the first station 10 scans all established channels 12, selects the highest hyper-frame number 13r, 13t, increments this value by one and then assigns it to the hyper-frame numbers 13r and 13t for the new channel 12. The new channel 12 will thus receive hyper-frame numbers 13r, 13t that are much greater than zero, and which may possibly lead to the formation of a security count 14c for the new channel 12 that is very close to the security cross-over value 14x. This will cause a considerable shortening of the lifetime of the new security key 14n.

SUMMARY OF INVENTION

It is therefore a primary objective of this invention to provide a method for obtaining a security count value for a new channel that is established during a changing of a security key.

Briefly summarized, the preferred embodiment of the present invention discloses a method for calculating an initial security count value for a new channel in a wireless communications device. The wireless communications device has a first security key, a second security key, and established channels. Each established channel has a corresponding security count value, and utilizes a security key. At least one of the established channels utilizes the first security key. The second security key is assigned to the new channel. A first set is then used to obtain a first value. The first set has only security count values of all the established channels that utilize the second key. The first value is at least as great as the x most significant bits ($MSB_x$) of the greatest value in the first set. The $MSB_x$ of the initial security count value for the new channel is set equal to the first value. If the first set is empty, then the first value is set to zero.

It is an advantage of the present invention that by considering the security count values associated with only those channels that use the second key, the new channel is prevented from obtaining an excessively high security count value. The lifetimes of security keys are thus prevented from being prematurely shortened.

These and other objectives of the present invention will no doubt become obvious to those of ordinary skill in the art after reading the following detailed description of the preferred embodiment, which is illustrated in the various figures and drawings.

DETAILED DESCRIPTION

In the following description, a station may be a mobile telephone, a handheld transceiver, a base station, a personal data assistant (PDA), a computer, or any other device that requires a wireless exchange of data. It should be understood that many means may be used for the physical layer to effect wireless transmissions, and that any such means may be used for the system hereinafter disclosed.

Figure 1:
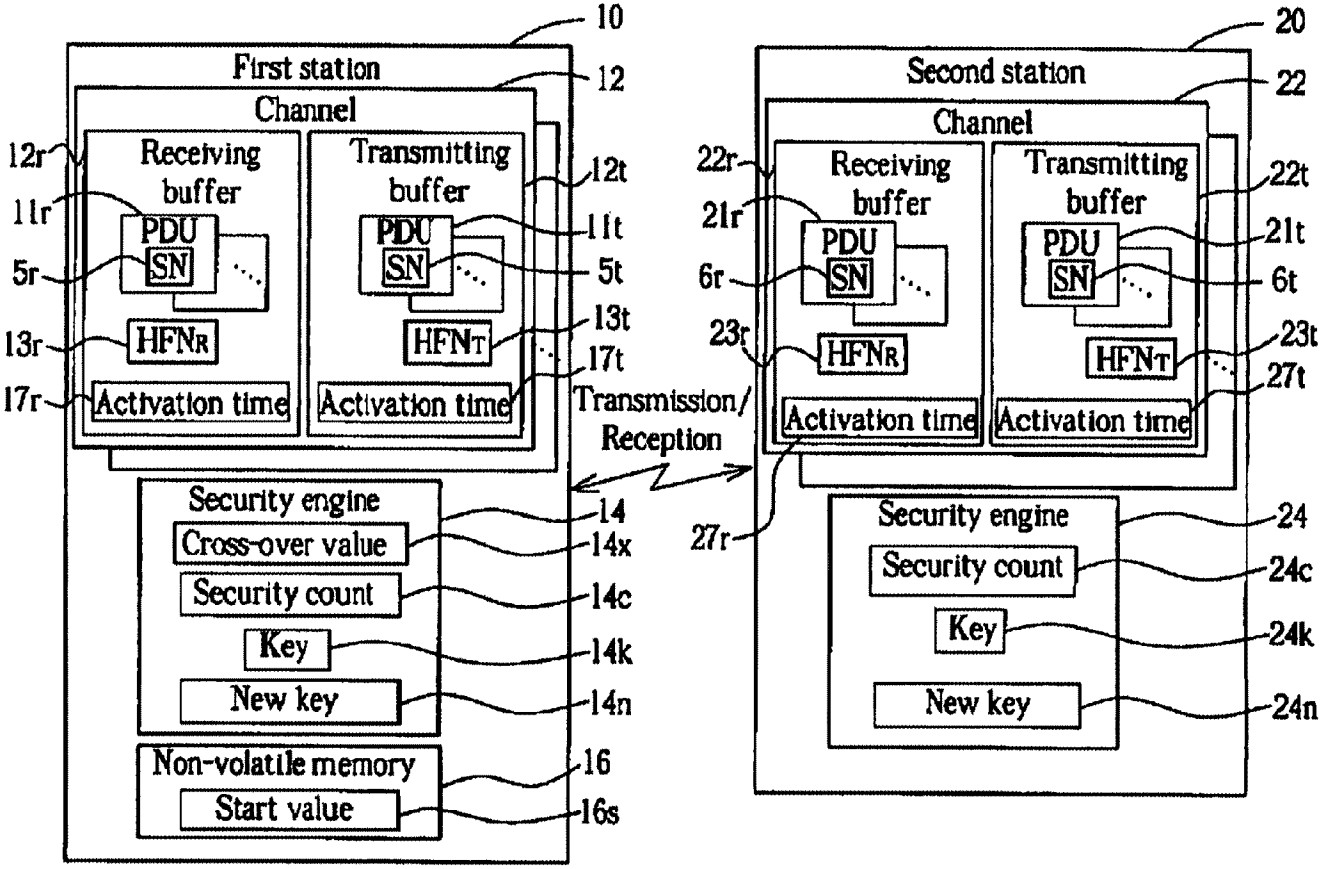
Fig. 1 Prior art
FIG. 1 is a simplified block diagram of a prior art wireless communications system.
Figure 2:
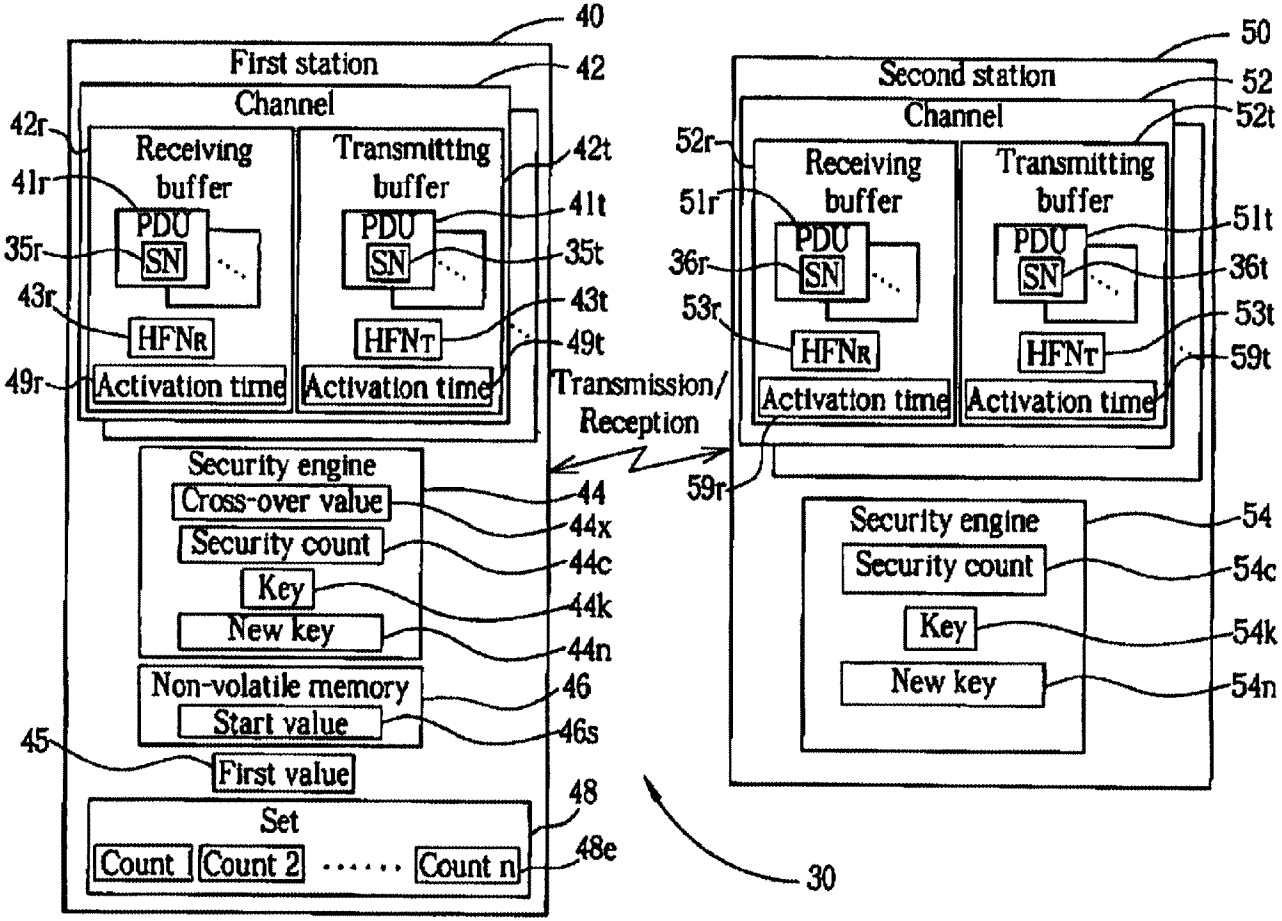
FIG. 2 is a simplified block diagram of a wireless communications system according to the present invention.

Please refer to FIG. 2. FIG. 2 is a simplified block diagram of a wireless communications system 30 according to the present invention. The wireless communications system 30 is much like that of the prior art, as it is the primary objective of the present invention to change the method used for assigning an initial security count value 44c, 54c to a newly established channel 42, 52. The wireless communications system 30 includes a first station 40 in wireless communications with a second station 50 over a plurality of established channels 42. The first station 40 may establish a channel 42 to effect communications with the second station 50. The second station 50 establishes a corresponding channel 52 for the channel 42 of the first station 40. The first station 40 may also release an established channel 42, in which case the second station 50 releases the corresponding channel 52. Each channel 42 has a receiving buffer 42r and a transmitting buffer 42t. Similarly, on the second station 50, each channel 52 has a receiving buffer 52r and a transmitting buffer 52t. The receiving buffer 42r is used to hold protocol data units (PDUs) 41r received from the second station 50. The transmitting buffer 42t is used to hold PDUs 41t awaiting transmission to the second station 50. A PDU 41t is transmitted along its channel 42 to the second station 50, where it is received and placed into the receiving buffer 52r of the corresponding channel 52. Similarly, a PDU 51t is transmitted along its channel 52 to the first station 40, where it is received and placed into the receiving buffer 42r of the corresponding channel 42. Each PDU 41r, 41t, 51r, 51t has an m-bit sequence number (SN) 35r, 35t, 36r, 36t that indicates the sequential position of the PDU 41r, 41t, 51r, 51t within its respective buffer 42r, 42t, 52r, 52t. Sequentially later PDUs 41r, 41t, 51r, 51t have sequentially higher sequence numbers 35r, 35t, 36r, 36t. As the sequence number 35r, 35t, 36r, 36t has a fixed bit size of m bits, the sequence number 35r, 35t, 36r, 36t will rollover to zero when its value exceeds $2^m-1$. The receiving buffers 42r, 52r each have a respective receiving hyper-frame number ($HFN_R$) 43r, 53r that is incremented by one upon detection of such a rollover event of the sequence number 35r, 36r of received PDUs 41r, 51r. The $HFN_R$ 43r, 53r associated with each received PDU 41r, 51r thus serves as high-order bits (most significant bits) for the sequence number 35r, 36r of the received PDU 41r, 51r. Similarly, each transmitting buffer 42t, 52t has a respective transmitting hyper-frame number ($HFN_T$) 43t, 53t that serves as the high-order, most significant bits of the sequence number 35t, 36t of each transmitted PDU 41t, 51t. The hyper-frame numbers 43r, 43t, 53r, 53t are internally maintained by the first station 40 and second station 50, and are explicitly transmitted only during synchronization events. This is in contrast to the sequence numbers 35t, 36t, which are typically carried by their respective PDUs 41t, 51t.

The first station 40 has a security engine 44 that is used to perform enciphering/deciphering and data integrity checks of the PDUs 41r, 41t. Two of a multiple of inputs into the security engine particularly include an n-bit security count 44c, and a first security key 44k. A corresponding security engine 54 is provided on the second station 50, which also uses an n-bit security count 54c and a first security key 54k. A PDU 41t is enciphered by the security engine 44 using a distinct security count 44c, and the first key 44k. To properly decipher the corresponding received PDU 52r, the security engine 54 must use a security count 54c that is identical to the security count 44c, and the first security key 54k that is identical to the first security key 44k. Integrity checking of PDUs 41r, 41t, 51r, 51t also utilizes synchronized security counts, but as these integrity security counts are almost invariably smaller than the ciphering security counts 44c, 54c, for purposes of the following discussion it is the ciphering security counts 44c, 54c that are considered.

The first security keys 44k and 54k are changed whenever the security count 44c for any established channel 42 exceeds a predetermined cross-over value 44x. A security mode command is used to synchronize the security engines 44 and 54 from using the first security key 44c, 54c to using a second, new security key 44n, 54n. The security count 44c, 54c continuously changes with each PDU 41r, 41t, 51r, 51t along the channel 42, 52. The security count 44c is generated for each PDU 41r, 41t by using the sequence number 35r, 35t of the PDU 41r, 41t as the low-order (least significant) bits of the security count 44c, and the $HFN_R$ 43r, $HFN_T$ 43t, respectively associated with the PDU 41r, 41t, as the high-order bits of the security count 44c. A corresponding process is used by the security engine 54 of the second station 50. For a stream of transmitted PDUs 41t along an established channel 42, the security count 44c associated with the channel 12 continuously increases with each PDU 41t. The same is thus also true for streams of PDUs 51t transmitted by the second station 50. The range of security count values 44c used by the various channels 42 may vary widely. Typically, all channels 42 will use either the first security key 44k or the second security key 44n.

Initially, the first station 40 has no established channels 42 with the second station 50. To establish a channel 42 with the second station 50, the first station 40 first extracts a start value 46s from a non-volatile memory 46 of the first station 40, and uses this start value 46s to generate the $HFN_T$ 43t and the $HFN_R$ 43r for the channel 42 that is to be established. The non-volatile memory 46 is used to permanently store data for the first station 40, and may be an electrically erasable programmable read-only memory (EEPROM), a SIM card, or the like, so that the start value 46s is not lost when the first station 40 is turned off. Ideally, the bit size of the start value 46s should be equal to the bit size of the hyper-frame numbers 43t and 43r. In this case, the $HFN_T$ 43t and the $HFN_R$ 43r are simply set equal to the start value 46s. If, however, the start value 46s is x bits in size for m-bit hyper-frame number 43t, 43r, and x is less than m, then the start value 46s is used as the x most significant bits ($MSB_x$) of the hyper-frame numbers 43t, 43r, and the remaining low-order bits of $HFN_T$ 43t and $HFN_R$ 43r are simply set to zero. After generating the hyper-frame numbers 43t and 43r by way of the start value 46s, the first station 40 transmits the start value 46s (or, alternatively, one of $HFN_T$ 43t or $HFN_R$ 43r) to the second station 50 so that the second station 50 may set the $HFN_R$ 53r and the $HFN_T$ 53t of the corresponding channel 52 equal to the initial value of the hyper-frame numbers 43t and 43r. In this manner, the $HFN_T$ 43t is synchronized with the corresponding $HFN_R$ 53r, and the $HFN_R$ 43r is synchronized with the corresponding $HFN_T$ 53t. As the start value 46s is an x-bit sized number, and the $HFN_T$ 43t is used as the most significant bits of the security count 44c for transmitted PDUs 41t, the start value 46s effectively holds the $MSB_x$ of the n-bit security count 44c, where n is equal to the sum of the bit size of the $HFN_T$ 43t and the bit size of the sequence number 35t. This is also true for the security count 44c for received PDUs 41r, as regards $HFN_R$ 43r. A security key is also assigned to the newly established channel 42, such as the first security key 44k, which is then used by the security engine 44 for ciphering and deciphering operations of the new channel 42 Many other channels 42 may be established by the first station 40 (or in response to a channel 52 being established by the second station 50) after an initial channel 42 has been established. When establishing a new channel 42 when other channels 42 are already established, the first station 40 first assigns a security key to the new channel 42. The security key will typically be the security key that is already in use by all other established channels 42, such as the first security key 44k. However, due to a security mode command, the new channel 42 may be assigned a second security key, such as the new security key 44n, that is different from that of other established channels 42. By way of example, it is assumed in the following that the first station 40 assigns the new security key 44n to a new channel 42. The first station 40 must next assign hyper-frame numbers 43r and 43t to the new channel 42. To do this, the first station 40 parses all other established channels 42 that also use the new security key 44n (i.e., the same security key that is assigned to the new channel 42) at the time the new channel 42 is being established, and selects the greatest security count 44c from all of these channels 42. This greatest security count 44c may be formed from either a receiving hyper-frame number $HFN_R$ 43r, or a transmitting hyper-frame number $HFN_T$ 43t, and is used to generate the hyper-frame numbers 43r, 43t of the new channel 42. For simplicity in the following discussion, it is assumed that the hyper-frame numbers 43r, 43t of the new channel 42 are both x bits in size, and that the x most significant bits ($MSB_x$) of this so-called greatest security count 44c are copied into a temporary holding space as a first value 45. For example, if the hyper-frame numbers 43r, 43t for the new channel 42 are 20 bits in size, then the $MSB_{20}$ of the greatest security count 44c (associated with the new security key 44n) are used as the first value 45. The first value 45 is then incremented if the first value 45 is less than $2^x-1$, so as to ensure that no rollover to zero (i.e., over-flow) occurs. The first value 45 is then copied into the $HFN_R$ 43r and the $HFN_T$ 43t of the new channel 42. Note that if no other established channels 42 are using the new security key 44n (i.e., the same security key that is being used by the new channel 42) at the time that the new channel 42 is being established, then the hyper-frame values 43r and 43t for the new channel 42 are simply set to zero. That is, the first value 45 is given a default value of zero, which becomes the value for the hyper-frame numbers 43r and 43t. Alternatively, as zero is sometimes used as a flag, another small value, such as one, may be used.

Note that the above is, in fact, setting the $MSB_x$ of an initial value for the security counts 44c (one for the receiving buffer 42r, another for the transmitting buffer 42t) for the new channel 42 according to the $MSB_x$ of the security counts 44c of other established channel 42 that use the same security key 44n as is used by the new channel 42. In effect, a set 48 of elements 48e is parsed. Each element 48e is a security count 44c for either a receiving buffer 42r or a transmitting buffer 42t of a channel 42 that uses the new security key 44n. Each and every security count 44c that is associated with the new security key 44n is represented as an element 48e in the set 48. Each channel 42 that uses the new security key 44n thus provides two elements 48e to the set 48. The $MSB_x$ of the largest element 48e in this set 48 are then extracted, incremented, and used as the $MSB_x$ for the security counts 44c for the receiving buffer 42r and transmitting buffer 42t of the new channel 42, by way of the hyper-frame numbers 43r and 43t of the new channel 42.

The present invention method is particularly important for the determination of the hyper-frame numbers 43r, 43t of a new channel 42 that is established just after, or during, a security mode reconfiguration. Initially, a plurality of channels 42 are established, each using the first security key 44k. A security mode command is performed some time later, which culminates in a receiving activation time 49r for each receiving buffer 42r, and a transmitting activation time 49t for each transmitting buffer 42t. After reception of the security mode command, when the sequence numbers 35r, 35t of PDUs 41r, 41t exceed their respective buffer 42r, 42t activation times 49r, 49t, the respective hyper-frame number 43r, 43t is cleared to zero, and the second, new security key 44n is then applied to the PDUs 41r, 41t. As an example, consider a stream of PDUs 41t in a transmitting buffer 42t having sequence numbers 35t ranging from 18 to 35. Further assume that this transmitting buffer 42t has an $HFN_T$ 43t of 168, and an activation time 49t of 30. After reception of the security mode command, the PDUs 41t with sequence numbers 35t from 18 to 29 are transmitted using the first security key 44k, and security counts 44c with most significant bits (MSBs) given by the $HFN_T$ value 43t of 168. PDUs 41t with sequence numbers 35t from 30 to 35, however, are transmitted using the second security key 44n, and security counts 44c with most significant bits (MSBs) given by a new $HFN_T$ value 43t of zero. When establishing a new channel 42, the second, new security key 44n is assigned to this new channel 42. The first station 40 then considers every buffer 42r, 42t that has reached or exceeded its respective activation time 49r, 49t, and is thus using the new security key 44n at the time that the new channel 42 is being established. The largest security count 44c of such buffers 42r, 42t is then used in the manner previously described to generate the hyper-frame numbers 43r, 43t for the new channel 42. Again, if no such buffers 42r, 42t exist, then the hyper-frame numbers 43r, 43t for the new channel 42 are simply set to a default value, such as zero. Note that no security count values 44c are considered for buffers 42r, 42t that have not reached or exceeded their respective activations times 49r, 49t, and which thus continue to use the first security key 44k. Because of this, the present invention avoids entangling hyper-frame numbers 43r, 43t that properly associate with the first security key 44k when assigning values to hyper-frame numbers 43r, 43t that associate with the second, new security key 44n. In this manner, the lifetime of the new security key 44n is not prematurely shortened due to an initial assignment of unduly high hyper-frame numbers 43r, 43t. As before, the above description of the present invention method may be thought of as the parsing of a set 48 that contains all security count values 44c (as elements 48e) that are associated with the second, new key 44n at the time that the new channel 42 is initiated for establishment. The $MSB_x$ of the largest-valued element 48e in this set 48 are extracted, incremented, and used for the x-bit hyper-frame numbers 43r, 43t of the new channel 42, thus providing the $MSB_x$ for the initial values of the security counts 44c of the new channel 42.

In contrast to the prior art, the present invention only considers security count values associated with a second security key when assigning an initial security count value to a new channel that uses the second security key. Security count values associated with the first security key thus do not influence the calculation of the new security count value for the new channel, and so do not lead to a prematurely shortened lifetime for the second security key.

Those skilled in the art will readily observe that numerous modifications and alterations of the device may be made while retaining the teachings of the invention. Accordingly, the above disclosure should be construed as limited only by the metes and bounds of the appended claims.

What is claimed is:

[1. A method for calculating an initial security count value for a new channel in a wireless communications device, the wireless communications device comprising:

a first security key;

a second security key; and a plurality of established channels, each established channel having a corresponding security count value and utilizing a security key, at least one of the established channels utilizing the first security key;

the method comprising:

assigning the second security key to the new channel;

utilizing a first set to obtain a first value, the first set consisting of corresponding security count values of the established channels that utilize the second key, the first value being at least as great as the x most significant bits ($MSB_x$) of a value in the first set; and setting the $MSB_x$ of the initial security count value for the new channel equal to the first value;

wherein if the first set is empty, then the first value is set to a first predetermined value.]

[2. The method of claim 1 wherein the first predetermined value is zero.]

[3. The method of claim 2 wherein the first value is at least as great as the $MSB_x$ of the greatest value in the first set.]

[4. The method of claim 3 wherein the first value is greater than the $MSB_x$ of the greatest value in the first set.]

[5. A method for providing an initial security count value to a new channel in a wireless communications device, the method comprising:

establishing at least a first channel, each first channel utilizing a first security key and having a corresponding security count value;

performing a security mode reconfiguartion to change utilization of each first channel from the first security key to a second security key according to an activation time for each first channel; wherein upon utilization of the second security key, the corresponding security count value for the first channel is changed;

initiating establishment of a second channel that utilizes the second security key;

utilizing a first set to obtain a first value, the first set consisting of corresponding security count values of the established channels that utilize the second key, the first value being at least as great as the x most significant bits ($MSB_x$) of a value in the first set; and setting the $MSB_x$ of the initial security count value for the second channel equal to the first value;

wherein if the first set is empty, then the first value is set to a first predetermined value.]

[6. The method of claim 5 wherein the first set includes the corresponding security count values of all first channels utilizing the second security key when initiating the establishment of the second channel.]

[7. The method of claim 6 wherein the predefined value is zero.]

[8. The method of claim 5 wherein the first value is at least as great as the $MSB_x$ of the greatest value in the first set.]

[9. The method of claim 8 wherein the first value is greater than the $MSB_x$ of the greatest value in the first set.]

*10. A method for calculating an initial security count value for a new channel, the method comprising:*

*establishing a plurality of established channels in a wireless communication device, wherein each established channel in the wireless communication device has a corresponding security count value and utilizes a first security key:*

*performing a security mode reconfiguration to change utilization of each of the established channels in the wireless communication device from the first security key to a second security key according to an activation time for each of the established channels, wherein upon utilization of the second security key by one of the established channels, the corresponding security count value for the one of the established channels is changed, wherein the second security key is a new security key that replaces the first security key and is different from the first security key:*

*initiating establishment of a new channel in the wireless communication device;*

*assigning the second security key to the new channel;*

*utilizing a first set to obtain a first value, wherein the first set is consisting of corresponding security count values of the established channels in the wireless communication device that utilize the second key, and wherein the first value is at least as great as the x most significant bits (MSBx) of a value in the first set and at least one of the established channels utilizing the first security key: and*

*setting the MSBx of the initial security count value for the new channel equal to the first value, wherein if the first set is empty, then the first value is set to a first predetermined value.*

*11. The method of claim 10, wherein the first predetermined value is zero.*

*12. The method of claim 10, wherein the first value is a least as great as the MSBx of the greatest value in the first set.*

*13. The method of claim 10, wherein the first value is greater than the MSBx of the greatest value in the first set.*

*14. The method of claim 10, wherein the first set includes the corresponding security count values of each established channel in the wireless communication device utilizing the second security key when initiating the establishment of the new channel in the wireless communication device.*

* * * * *